US012775811B1

(12) United States Patent
Armleder

(10) Patent No.: US 12,775,811 B1
(45) Date of Patent: Oct. 27, 2026

(54) SMARTCARD READER WITH BUTTON-ACTIVATED ELECTRONIC CARD EXTRACTION AND REINSERTION SIMULATION

(71) Applicant: Sebastien Armleder, Carouge (CH)

(72) Inventor: Sebastien Armleder, Carouge (CH)

(73) Assignee: Sebastien Armleder, Carouge (CH)

( * ) Notice: Subject to any disclaimer, the term of this patent is extended or adjusted under 35 U.S.C. 154(b) by 0 days.

(21) Appl. No.: 19/534,472

(22) Filed: Feb. 9, 2026

(30) Foreign Application Priority Data

Dec. 30, 2025 (AT) .............................. A 55114/2025
Dec. 30, 2025 (DE) ......................... 202025108028.1

(51) Int. Cl.
*G06K 7/10* (2006.01)

(52) U.S. Cl.
CPC ................................ *G06K 7/10297* (2013.01)

(58) Field of Classification Search
CPC ...... G06K 7/10297; G06K 7/08; G06K 7/008; G06K 7/10316; G06K 7/07769; G06K 19/07345; G06K 19/07749; G06K 7/10237
USPC ......................................... 235/451, 380, 492
See application file for complete search history.

(56) References Cited

U.S. PATENT DOCUMENTS 8,001,311 B2 8/2011 Herskedal et al.
2002/0087868 A1* 7/2002 King .................... G06K 13/085 713/185
2008/0093452 A1* 4/2008 Will ..................... G06K 7/0021 235/441
2010/0038418 A1 2/2010 Fomitchev et al.
2010/0188195 A1* 7/2010 Busch-Sorensen ...... H04B 5/26 340/10.1
2021/0192529 A1* 6/2021 Souchon ................. G06F 21/32
2024/0127011 A1* 4/2024 Ruscher ............. G06K 7/10297

FOREIGN PATENT DOCUMENTS

EP 0862130 A2 9/1998
EP 1391840 A1 2/2004
EP 3584738 A2 12/2019

OTHER PUBLICATIONS

Search Report received in DE Application No. 202025108028.1 on Sep. 23, 2026.
Wikipedia, “Selbstrückstellende Sicherung”, version of Jul. 19, 2024.

* cited by examiner

*Primary Examiner* — Edwyn Labaze
(74) *Attorney, Agent, or Firm* — ALG Intellectual Property, LLC

(57) ABSTRACT

A smartcard reader includes a housing, an input mechanism configured to be actuated by a user, a smartcard connector configured to receive a smartcard, a microcontroller, a power-gating circuitry configured to interrupt and restore electrical power to a smartcard received by the smartcard connector, and a card-presence detection circuitry configured to provide a presence signal indicating presence and/or absence of a smartcard at the smartcard connector. The smartcard reader is configured to electronically simulate extraction and reinsertion of a smartcard received by the smartcard connector without physically removing said smartcard from the smartcard connector. The smartcard reader is further configured to simulate extraction and reinsertion conditional on receiving a user input via the input mechanism.

20 Claims, 4 Drawing Sheets

SMARTCARD READER WITH BUTTON-ACTIVATED ELECTRONIC CARD EXTRACTION AND REINSERTION SIMULATION

RELATED APPLICATIONS

The present application claims priority to DE Utility Model Application No. 20 2025 108 028.1, filed Dec. 30, 2025, and to AT Utility Model Application No. GM55114/2025, filed Dec. 30, 2025, each of which is hereby incorporated by reference in its entirety.

BACKGROUND INFORMATION

FIDO2 comprises the W3C Web Authentication (WebAuthn) specification and the FIDO Alliance Client-to-Authenticator Protocol (CTAP). WebAuthn defines a standard browser and platform API that enables creation and use of scoped public-key credentials, while CTAP enables clients to communicate with external or platform authenticators over transports including USB, NFC, and BLE. Together, FIDO2 supports passwordless, second-factor, and multi-factor authentication using embedded (platform) or external (roaming) authenticators. Authenticators ensure user presence or verification via user gestures (e.g., touch sensors, biometric verification, PIN) before performing operations such as credential creation or assertion.

In other words, cryptographic authentication using smartcards and FIDO2-compliant authentication tokens typically requires a reliable user-presence verification. In near-field communication (NFC) based implementations, a physical tap may be used to confirm presence of the user. That is, a smartcard comprising the authentication token may be tapped against a respective reader to indicate the user's presence.

However, in ISO 7816 contact smartcard implementations tapping the card is not possible. Instead, in contact smartcard contexts, the user-presence gesture may typically be implemented by physical removal and reinsertion of the smartcard recognized by the host operating system. In other words, in ISO 7816 contact smartcard implementations, operating systems typically interpret removal and reinsertion of the card as the presence event, which leads to users having to physically extract and reinsert the card for each authentication operation. However, repeated mechanical manipulation creates inconvenience for users, introduces mechanical wear to both the smartcard and the reader, and can cause intermittent contact issues that produce failed authentications.

EP 0 862 130 A2 discloses a smart card reader comprising a limit switch which is engaged by the edge of an inserted card to signal that it is in the correct position. However, while this may generally allow sensing of correct positioning of the smartcard, it does not provide any mechanism to electronically simulate reinsertion without physical movement of the smartcard.

EP 3 584 738 B1 discloses a reader device that is only powered wen a card is inserted into the reader device, thereby reducing the amount of time the reader device is powered. However, it does not disclose any power cycling for user-presence verification.

U.S. Pat. No. 8,001,311 B2 for example discloses purely software-based simulation card removal and reinsertion in the context of a smartcard not being fully installed or recognized. However, while some systems attempt such software resets, many host platforms only treat a complete removal and reinsertion sequence as a new presence event, particularly in the context of user-presence verification. Therefore, there is a need for improved techniques to create a host-recognized removal/reinsertion event without physically moving the card.

DETAILED DESCRIPTION

Figure 1:
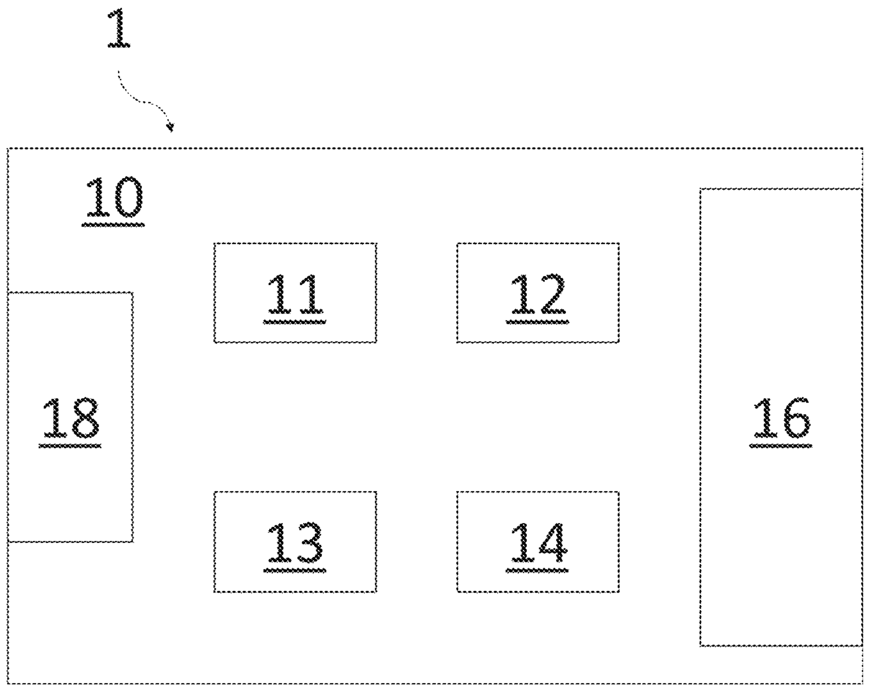
FIG. 1 illustrates an exemplary embodiment of a smartcard reader.

The present invention generally relates to smartcard readers and authentication hardware. More particularly, it concerns a contact smartcard reader suited for FIDO2 security keys implemented in accordance with ISO 7816.

In light of the above, it is an object to overcome or at least alleviate the shortcomings and disadvantages of the prior art. That is, it is an object of the present invention to provide a smartcard reader that allows for a host-recognized removal/reinsertion event without physically moving the card.

These objects are met by the present invention.

In a first aspect, the present invention relates to a smartcard reader comprising a housing, an input mechanism configured to be actuated by a user, a smartcard connector configured to receive a smartcard, a microcontroller, a power-gating circuitry configured to interrupt and restore electrical power to a smartcard received by the smartcard connector, a card-presence detection circuitry configured to provide a presence signal indicating presence and/or absence of a smartcard at the smartcard connector.

Interrupting and restoring electrical power to the smartcard may either refer to the electrical power directly provided to the smartcard via an electrical contact (in case of a contact smartcard) or the power transmitted by the respective NFC-field in case of a contactless smartcard.

The smartcard reader may be configured to electronically simulate extraction and reinsertion of a smartcard received by the smartcard connector without physically removing said smartcard from the smartcard connector. Electronically simulating extraction particularly refers to manipulation of physical signals (e.g. power to the received smartcard and/or presence signal) and thus not simply refers to a software-based simulation. Such manipulation of physical signals may be more reliably cause the host to actually acknowledging successful extraction and reinsertion. In other words, the smartcard reader may allow to simulate extraction and reinsertion of the smartcard without actually physically moving the smartcard. This may advantageously allow to perform FIDO2-compliant user-presence checks supporting passwordless authentication workflows without the user needing to actually remove the smartcard. Simply actuating the input mechanism instead of having to physically remove and reinsert the smartcard may improve convenience for a user and additionally may reduce mechanical wear and contact degradation caused by repeated physical removal.

The smartcard reader may be configured to simulate extraction and reinsertion conditional on receiving a user input via the input mechanism. This may advantageously ensure that the user is present and thus still allow for a meaningful user-presence validation.

The smartcard reader may be configured to perform a controlled interruption of power to a received smartcard via the power-gating circuitry.

The smartcard reader may be configured to perform a controlled restoration of power to a received smartcard via the power-gating circuitry. In other words, the smartcard reader may be configured to reestablish power to the received smartcard in a controlled manner and via the power-gating circuitry.

The smartcard reader may be configured to manipulate the presence signal. In particular, the smartcard reader may be configured to manipulate the presence signal to simulate removal of a received smartcard. Similarly, the smartcard reader may be configured to manipulate the presence signal to simulate reinsertion of a received smartcard.

Such a hardware-level simulation through manipulation of the presence signal (e.g. the presence line) and the power supplied to the card (e.g. the VCC) may advantageously be more reliable and less error prone than software-only approaches and significantly increase the chance (or even ensure) that host systems interpret the event as genuine reinsertion.

The microcontroller may be configured to perform the following steps, preferably in sequence, and conditional on receiving a signal from the input mechanism indicating a user input: interrupt power to a received smartcard via the power-gating circuitry; manipulate the card-presence detection circuitry and/or the presence signal such that the presence signal indicates absence of the smartcard, thereby simulating removal of the physically still present smartcard; manipulate the card-presence detection circuitry and/or the presence signal such that the presence signal indicates presence of the smartcard; and restore power to the received smartcard via the power-gating circuitry; thereby simulating reinsertion of the physically still present smartcard.

Preferably, the microcontroller may be configured to restore power after a predefined delay. Said delay may be in the range of 10 ms to 500 ms, preferably in the range of 20 ms to 200 ms. The preset delay may be programmable. That is, it may be possible to change the preset delay prior to performing the other method steps. This may advantageously allow to tailor the delay to specific requirements of the host system to improve compatibility with various host operating systems. In particular, the preset delay may be changed on a firmware level.

The step of electronically simulating extraction and reinsertion of a smartcard received by the smartcard connector may be completed within a time interval of 10 ms to 1000 ms, preferably 20 ms to 500 ms.

The smartcard reader may be configured such that electronically simulating extraction and reinsertion of the smartcard received in the smartcard connector triggers generation of an Answer to Rest (ATR) by the smartcard. The smartcard reader may be configured to transmit the Answer to Reset to a host. This may indicate successful reinsertion of the smartcard to the host system.

The input mechanism may comprise at least one of a button, a touch sensor, a proximity sensor, a biometric sensor, a microphone-based trigger (allowing for voice activation) or a gesture recognition, e.g. camera-based.

The input mechanism may be located in the housing in such a way that it can be accessed and particularly activated by a user. For example, the input mechanism may be fastened to the housing. Overall, the input mechanism may be mounted such that it can easily be accessed by a user during normal operation of the smartcard reader.

The smartcard connector may be configured to receive a contact-based smartcard. In particular, the smartcard connector may comprise a card slot for insertion of the contact-based smartcard. Additionally or alternatively, the smartcard connector may comprise electrical contacts for establishing an electrical connection with a received smartcard.

The smartcard connector may be configured to receive a contactless smartcard. In particular, the smartcard connector comprises an NFC interface for contactless reception and communication with a smartcard.

The microcontroller may be configured to control the smartcard reader.

The microcontroller may be configured to control the card-presence detection circuitry. In particular, the microcontroller may be configured to manipulate (e.g., toggle) the presence signal provided by the card-presence detection circuitry.

The microcontroller may be configured to control the power-gating circuitry.

The microcontroller may be configured to receive a signal from the input mechanism. This may allow the microcontroller to register and/or detect a user input provided by means of actuation of the input mechanism, e.g. button.

The power-gating circuitry may be configured to disable the voltage common collector (VCC) to the smartcard. In particular, the power-gating circuitry may be configured to control the VCC in accordance with ISO 7816-3 reset timing.

The presence signal may be a digital presence signal. Preferably, a logical high may indicate presence of a smartcard and a logical low may indicate absence of a smartcard. Thus, a transition from logical high to logical low may indicate removal of a smartcard, while a transition from logical low to logical high may indicate insertion of a smartcard.

The card-presence circuitry may comprise at least one of a mechanical switch, a hall-effect sensor, an NFC sensor and an optical sensor to provide the respective presence signal.

The smartcard reader may further comprise an interface configured to enable communication with an external host. The interface may be configured for wired and/or wireless configuration with the external host. The interface may be configured to also allow the external host to supply power to the smartcard reader. The interface may be configured to enable communication via USB and/or UART.

The smartcard reader may be configured to transmit an Answer to Reset provided by the smartcard to a host via the interface.

The smartcard reader may be configured to read smartcards received by the smartcard connector, and particularly smartcards comprising a FIDO2 authentication token.

The smartcard reader may comprise a redundant fallback circuit configured to ensure manipulation of the presence signal independent of the microcontroller.

The microcontroller may be configured to provide a clock to the received smartcard.

The microcontroller may be configured to issue a reset signal to the received smartcard.

The smartcard reader may be configured to transmit the presence signal to a host.

The microcontroller of the smartcard reader may be configured to perform the method according to the present invention as described below.

In another aspect, the present invention relates to a method for simulating physical extraction and reinsertion of a smartcard physically received by a smartcard reader, the method comprising: receiving a signal indicative of actuation of a user-actuated input mechanism; disabling electrical power to the smartcard; manipulating a presence signal to a state representing absence or removal of the smartcard; manipulating the presence signal to a state representing presence or insertion of the smartcard; and restoring electrical power to the smartcard; while the smartcard remains physically received by the smartcard reader.

This may advantageously allow to comply with requirements if a user-presence check, e.g. when using a FIDO2 authentication token, without actually having to physically remove and reinsert the smart card. This may have the benefit of the user not having do fiddle with the smartcard and/or the smartcard reader, which may be required to be picked up to be able to remove and reinsert the smartcard. Furthermore, the mechanical stress and wear on the smartcard reader and the smartcard can advantageously be significantly reduced. Overall, this method may thus provide a user-friendly, reliable method for a user-presence check that simulates removal and reinsertion of the smartcard as required for known protocols.

The method may comprise causing the smartcard to generate an Answer to Reset (ATR). This may indicate an insertion event to a host connected to the smartcard reader and may advantageously serve as evidence of said insertion event. Thus, causing the smartcard to generate an ATR may advantageously aid with the host recognizing the simulated reinsertion as authentic.

The smartcard reader may preferably be a smartcard reader according to the present invention and particularly as described herein (e.g. above). The smartcard may be physically received by the smartcard connector of the smartcard reader.

The steps of the method may be controlled by the microcontroller of the smartcard reader.

The step of disabling electrical power to the smartcard may be performed by controlling the power-gating circuitry accordingly. Additionally or alternatively, the step of restoring electrical power to the smartcard may be performed by controlling the power-gating circuitry accordingly. In particular, the microcontroller may control the power-gating circuitry to disable and/or restore electrical power to the smartcard received by the smartcard reader.

Generally, the step of restoring electrical power to the smartcard may be delayed with respect to the step of disabling electrical power to the smartcard by a predefined delay. This may advantageously allow to comply with given specifications of known standards and/or protocols. The predefined delay may be in the range of 10 ms to 500 ms, preferably 20 ms to 200 ms. The predefined delay may be programmable. This may advantageously allow to adjust the delay to comply with prerequisites of the host. In particular, the method may comprise setting the programmable, predefined delay to a value compatible with a target host operating system prior to performing the other steps of the method.

The step of manipulating the presence signal to a state representing absence or removal of the smartcard may comprise driving the presence signal (and thus the presence line) low during simulated removal. Additionally or alternatively, the step of manipulating the presence signal to a state representing presence or insertion of the smartcard may comprise driving the presence signal (and thus the presence line) high during simulated reinsertion.

The method may further comprise detecting a failure condition of the microcontroller and activating a redundant hardware fallback circuit for manipulating the presence signal.

Disabling and/or restoring electrical power to the smartcard may comprise controlling VCC in accordance with ISO 7816-3 reset timing.

Generally, the method may further comprise communicating with a host device. Said communicating with the host device may comprise communicating via a USB interface. Additionally or alternatively communicating with the host device may comprise transmitting removal and/or insertion notifications to the host device. Communicating with the host device may further comprise transmitting the ATR to the host device. Communicating with the host device may comprise transmitting the presence signal to the host device.

The method may comprise providing a clock to the received smartcard.

The method may comprise issuing a reset signal to the received smartcard.

In another aspect, the present invention relates to a non-transitory computer-readable medium storing instruction that, when executed by a microprocessor of a smartcard reader, cause the microprocessor to perform the method steps according the present invention, as for example descried above. The smartcard reader may be a smartcard reader according to the present invention (as for example described above).

The present invention is also defined by the following numbered embodiments.

Below, reference will be made to smartcard reader embodiments. These embodiments are abbreviated by the letter "R" followed by a number. Whenever reference is herein made to "reader embodiments", these embodiments are meant.

R1. A smartcard reader comprising: a housing (10); an input mechanism (11) configured to be actuated by a user; a smartcard connector (16) configured to receive a smartcard; a microcontroller (12); a power-gating circuitry (13) configured to interrupt and restore electrical power to a smartcard received by the smartcard connector (16); a card-presence detection circuitry (14) configured to provide a presence signal indicating presence and/or absence of a smartcard at the smartcard connector (16).

That is, either the electrical power directly provided to the smartcard via an electrical contact (in case of a contact smartcard) or the power transmitted by the respective NFC-field in case of a contactless smartcard.

R2. The smartcard reader according to the preceding reader embodiment, wherein the smartcard reader is configured to electronically simulate extraction and reinsertion of a smartcard received by the smartcard connector (16) without physically removing said smartcard from the smartcard connector (16).

R3. The smartcard reader according to the preceding reader embodiment, wherein the smartcard reader is configured to simulate extraction and reinsertion conditional on receiving a user input via the input mechanism (11).

R4. The smartcard reader according to any of the 2 preceding reader embodiments, wherein the smartcard reader is configured to perform a controlled interruption of power to a received smartcard via the power-gating circuitry (13).

R5. The smartcard reader according to any of the 3 preceding reader embodiments, wherein the smartcard reader is configured to perform a controlled restoration of power to a received smartcard via the power-gating circuitry (13).

R6. The smartcard reader according to any of the 4 preceding reader embodiments, wherein the smartcard reader is configured to manipulate the presence signal.

R7. The smartcard reader according to the preceding reader embodiment, wherein the smartcard reader is configured to manipulate the presence signal to simulate removal of a received smartcard.

R8. The smartcard reader according to any of the 2 preceding reader embodiments, wherein the smartcard reader is configured to manipulate the presence signal to simulate reinsertion of a received smartcard.

R9. The smartcard reader according to any of the preceding reader embodiments and with the features of R2, wherein the microcontroller (13) is configured to perform the following steps conditional on receiving a signal from the input mechanism (11) indicating a user input: interrupt power to a received smartcard via the power-gating circuitry (13); manipulate the card-presence detection circuitry (14) and/or the presence signal such that the presence signal indicates absence of the smartcard, thereby simulating removal of the physically still present smartcard; manipulate the card-presence detection circuitry (14) and/or the presence signal such that the presence signal indicates presence of the smartcard; and restore power to the received smartcard via the power-gating circuitry (13); thereby simulating reinsertion of the physically still present smartcard.

R10. The smartcard reader according to the preceding reader embodiment, wherein the microcontroller (13) is configured to perform the steps in sequence.

R11. The smartcard reader according to any of the 2 preceding reader embodiments, wherein the microcontroller is configured to restore power after a predefined delay.

R12. The smartcard reader according to the preceding reader embodiment, wherein the delay is in the range of 10 ms to 500 ms, preferably in the range of 20 ms to 200 ms.

R13. The smartcard reader according to any of the 2 preceding reader embodiments, wherein the preset delay is programmable.

R14. The smartcard reader according to any of the preceding reader embodiments and with the features of R2, wherein electronically simulating extraction and reinsertion of a smartcard received by the smartcard connector (16) is completed within a time interval of 10 ms to 1000 ms, preferably 20 ms to 500 ms.

R15. The smartcard reader according to any of the preceding reader embodiments and with the features of R2, wherein the smartcard reader is configured such that electronically simulating extraction and reinsertion of the smartcard received in the smartcard connector (16) triggers generation of an Answer to Rest (ATR) by the smartcard.

R16. The smartcard reader according to the preceding reader embodiment, wherein the smartcard reader is configured to transmit the Answer to Reset to a host.

R17. The smartcard reader according to any of the preceding reader embodiments, wherein the input mechanism (11) comprises at least one of a button, a touch sensor, a proximity sensor, a biometric sensor, a microphone-based trigger (allowing for voice activation) or a gesture recognition, e.g. camera-based.

R18. The smartcard reader according to any of the preceding reader embodiments, wherein the input mechanism (11) is located in the housing (10) in such a way that it can be accessed and particularly activated by a user.

R19. The smartcard reader according to any of the preceding reader embodiments, wherein the input mechanism (11) is fastened to the housing (10).

R20. The smartcard reader according to any of the preceding reader embodiments, wherein the smartcard connector (16) is configured to receive a contact-based smartcard.

R21. The smartcard reader according to the preceding reader embodiment, wherein the smartcard connector (16) comprises a card slot for insertion of the contact-based smartcard.

R22. The smartcard reader according to any of the 2 preceding reader embodiments, wherein the smartcard connector (16) comprises electrical contacts for establishing an electric connection with a received smartcard.

R23. The smartcard reader according to any of the preceding reader embodiments, wherein the smartcard connector (16) is configured to receive a contactless smartcard.

R24. The smartcard reader according to the preceding reader embodiment, wherein the smartcard connector (16) comprises an NFC interface for contactless reception and communication with a smartcard.

R25. The smartcard reader according to any of the preceding reader embodiments, wherein the microcontroller (12) is configured to control the smartcard reader.

R26. The smartcard reader according to any of the preceding reader embodiments, wherein the microcontroller (12) is configured to control the card-presence detection circuitry (14).

R27. The smartcard reader according to any of the preceding reader embodiments, wherein the microcontroller (12) is configured to manipulate the presence signal provided by card-presence detection circuitry (14).

R28. The smartcard reader according to any of the preceding reader embodiments, wherein the microcontroller (12) is configured to control the power-gating circuitry (13).

R29. The smartcard reader according to any of the preceding reader embodiments, wherein the microcontroller (12) is configured to receive a signal from the input mechanism (11).

R30. The smartcard reader according to any of the preceding reader embodiments, wherein the power-gating circuitry (13) is configured to disable the voltage common collector (VCC) to the smartcard.

R31. The smartcard reader according to any of the preceding reader embodiments, wherein the power-gating circuitry (13) is configured to control the VCC in accordance with ISO 7816-3 reset timing.

R32. The smartcard reader according to any of the preceding reader embodiments, wherein the presence signal is a digital presence signal.

R33. The smartcard reader according to any of the preceding reader embodiments, wherein the card-presence circuitry (14) comprises at least one of a mechanical switch, a hall-effect sensor, an NFC sensor and an optical sensor to provide the respective presence signal.

R34. The smartcard reader according to any of the preceding reader embodiments, wherein the smartcard reader further comprises an interface (18) configured to enable communication with an external host.

R35. The smartcard reader according to the preceding reader embodiment, wherein the interface (18) is configured for wired and/or wireless configuration with the external host.

R36. The smartcard reader according to any of the 2 preceding reader embodiments, wherein the interface (18) is configured to also allow the external host to supply power to the smartcard reader.

R37. The smartcard reader according to any of the 3 preceding reader embodiments, wherein the interface (18) is configured to enable communication via USB and/or UART.

R38. The smartcard reader according to any of the 4 preceding reader embodiments and with the features of R15, wherein the smartcard reader is configured to transmit the Answer to Reset to a host via the interface (18).

R39. The smartcard reader according to any of the preceding reader embodiments, wherein the smartcard reader is configured to read smartcards received by the smartcard connector (16), and particularly smartcards comprising a FIDO2 authentication token.

R40. The smartcard reader according to any of the preceding reader embodiments, wherein the smartcard reader comprises a redundant fallback circuit configured to ensure manipulation of the presence signal independent of the microcontroller.

R41. The smartcard reader according to any of the preceding reader embodiments and with the features of R9 and/or R15, wherein the microcontroller is configured to provide a clock to the received smartcard.

R42. The smartcard reader according to any of the preceding reader embodiments and with the features of R9 and/or R15, wherein the microcontroller is configured to issue a reset signal to the received smartcard.

R43. The smartcard reader according to any of the preceding reader embodiments, wherein the smartcard reader is configured to transmit the presence signal to a host.

Below, reference will be made to method embodiments. These embodiments are abbreviated by the letter "M" followed by a number. Whenever reference is herein made to "method embodiments", these embodiments are meant.

M1. A method for simulating physical extraction and reinsertion of a smartcard physically received by a smartcard reader, the method comprising: receiving a signal indicative of actuation of a user-actuated input mechanism; disabling electrical power to the smartcard; manipulating a presence signal to a state representing absence or removal of the smartcard; manipulating the presence signal to a state representing presence or insertion of the smartcard; and restoring electrical power to the smartcard; while the smartcard remains physically received by the smartcard reader.

M2. The method according to the preceding method embodiment, further comprising causing the smartcard to generate an Answer to Reset (ATR).

M3. The method according to any of the preceding method embodiments, wherein the smartcard reader is a smartcard reader according to any of the preceding reader embodiments.

M4. The method according to the preceding method embodiment, wherein the smartcard is physically received by the smartcard connector.

M5. The method according to any of the 2 preceding method embodiments, wherein the steps of the method are controlled by the microcontroller.

M6. The method according to any of the 3 preceding method embodiments, wherein the step of disabling electrical power to the smartcard is performed by controlling the power-gating circuitry accordingly.

M7. The method according to any of the 4 preceding method embodiments, wherein the step of restoring electrical power to the smartcard is performed by controlling the power-gating circuitry accordingly.

M8. The method according to any of the preceding method embodiments, wherein the step of restoring electrical power to the smartcard is delayed with respect to the step of disabling electrical power to the smartcard by a predefined delay.

M9. The method according to the preceding method embodiment, wherein the predefined delay is in the range of 10 ms to 500 ms, preferably 20 ms to 200 ms.

M10. The method according to any of the 2 preceding method embodiments, wherein the predefined delay is programmable.

M11. The method according to the preceding method embodiment, wherein the method comprises setting the programmable, predefined delay to a value compatible with a target host operating system prior to performing the other steps of the method.

M12. The method according to any of the preceding method embodiments, wherein the step of manipulating the presence signal to a state representing absence or removal of the smartcard comprises driving a presence signal low during simulated removal.

M13. The method according to any of the preceding method embodiments, wherein the step of manipulating the presence signal to a state representing presence or insertion of the smartcard comprises driving a presence signal high during simulated reinsertion.

M14. The method according to any of the preceding method embodiments, wherein the method further comprises detecting a failure condition of the microcontroller and activating a redundant hardware fallback circuit for manipulating the presence signal.

M15. The method according to any of the preceding method embodiments, wherein disabling and/or restoring electrical power to the smartcard comprises controlling VCC in accordance with ISO 7816-3 reset timing.

M16. The method according to any of the preceding method embodiments, wherein the method further comprises communicating with a host device.

M17. The method according to the preceding method embodiment, wherein communicating with the host device comprises communicating via a USB interface.

M18. The method according to any of the 2 preceding method embodiments, wherein communicating with the host device comprises transmitting removal and/or insertion notifications to the host device.

M19. The method according to any of the 3 preceding method embodiments and with the features of M2, wherein communicating with the host device comprises transmitting the ATR to the host device.

M20. The method according to any of the 4 preceding method embodiments, wherein communicating with the host device comprises transmitting the presence signal to the host device.

M21. The method according to any of the preceding method embodiments, wherein the method comprises providing a clock to the received smartcard.

M22. The method according to any of the preceding method embodiments, wherein the method comprises issuing a reset signal to the received smartcard.

R44. The smartcard reader according to any of the preceding reader embodiments, wherein the microcontroller is configured to perform the method according to any of the preceding method embodiments.

Below, reference will be made to a non-transitory computer-readable medium embodiments. These embodiments are abbreviated by the letter "C" followed by a number. Whenever reference is herein made to "computer-readable medium embodiments", these embodiments are meant.

C1. A non-transitory computer-readable medium storing instruction that, when executed by a microprocessor of a smartcard reader, cause the microprocessor to perform the method steps according to any of the preceding method embodiments.

C2. The non-transitory computer-readable medium according to the preceding embodiment, wherein the smartcard reader is a smartcard reader in accordance with any of the preceding reader embodiments.

Embodiments of the present invention will now be described with reference to the accompanying drawings. These embodiments should only exemplify, but not limit, the present invention.

Reference is made to the drawings for purposes of illustrating example embodiments. The same reference numbers may be used throughout the drawings to refer to the same or like parts. However, it is noted that not all the drawings carry all the reference signs. Instead, in some of the drawings, some of the reference signs have been omitted for the sake of brevity and simplicity of the illustration.

Referring to FIG. 1, the present invention concerns a smartcard reader 1 comprising a housing 10, an input mechanism 11, a smartcard connector 16, a microcontroller 12, a power-gating circuitry 13, and a card-presence detection circuitry 14. Furthermore, the smartcard reader 1 (also referred to as "card reader" or simply "reader") may comprise an interface 18 configured for communicating with a host. Generally, the smartcard reader may be configured to read smartcards received by the smartcard connector 16, and particularly smartcards that are and/or comprise FIDO2 authentication tokens.

The input mechanism 11 is generally configured to be actuated by a user. That is, the input mechanism 11 may be configured to confirm presence of a user through activation by said user. In particular, the input mechanism 11 may comprise at least one of a button, a capacitive touch sensor, a proximity sensor, a biometric sensor, a microphone-based trigger (allowing for voice activation), or a gesture recognition (e.g. camera-based). The input mechanism 11 may generally be comprised by and/or mounted to the housing 10. In particular it may be located in the housing 10 in such a way that it can be accessed and particularly activated by a user. The input mechanism 11 may for example be fastened to the housing 10.

The smartcard connector 16 may generally be configured to receive a smartcard. The smartcard connector 16 may be configured to receive a contact-based smartcard. In particular, it may comprise a card slot for insertion of the contact-based smartcard. It may comprise electrical contacts configured to establish an electrical connection with a received smartcard, e.g. in accordance with a known standard. Additionally or alternatively, the smartcard connector 16 may be configured to receive a contactless smartcard. In particular, the smartcard connector 16 may provide an NFC interface for contactless reception and communication with a smartcard.

The microcontroller 12 may generally be configured control the smartcard reader and particularly the card-presence detection circuitry 14 and the power-gating circuitry 13. Furthermore, it may be configured to receive a signal from the input mechanism 11.

The power-gating circuitry 13 may generally be configured to interrupt and restore electrical power to a smartcard received by the smartcard connector 12. That is, either the electrical power directly provided to the smartcard via an electrical contact (in case of a contact smartcard) or the power transmitted based on induction via the respective NFC-field in case of a contactless smartcard. Particularly with respect to contact-based smartcards (particularly ISO781-comliant), the power-gating circuitry 13 may be configured to disable the voltage common collector (VCC) to the smartcard. In ISO/IEC 7816 smartcard systems, VCC refers to the supply voltage provided by the reader to power the smartcard's integrated circuit. It is one of the mandatory electrical contacts defined in the standard, alongside I/O, RST (reset), and GND. The VCC line delivers the operating voltage required for the card's microcontroller and secure element to function. When a card is inserted, the reader may apply VCC and then issue a reset signal, which may cause the card to transmit its ATR (Answer to Reset). Conversely, removing VCC effectively powers down the card, which most host systems may interpret as a removal event. Therefore, controlled interruption and restoration of VCC is central to simulating extraction and reinsertion electronically.

Generally, timing of the interruption and restoration of power may be tailored to the specific needs of underlying standards and/or protocols. It may be set through a preset delay, e.g. in the range of 20 ms to 200 ms, which may be programmable to account for specific needs. In particular, it may for example be programmable on a firmware level of the microcontroller and/or redundant hardware (e.g., a redundant fallback circuit). In particular, timing of VCC transitions may be required to comply with ISO 7816-3 specifications to ensure proper reset behavior and ATR generation. Improper sequencing can lead to communication errors or card malfunction.

The card-presence circuitry 14 may generally be configured to detect and signal presence and absence of a smartcard at the smartcard connector. That is, the card-presence circuitry 14 may be configured to detect when a smartcard is received by the smartcard connector, e.g. inserted into a card slit of the smartcard connector, and provide a respective presence signal. Similarly, the card-presence circuitry 14 may detect when a smartcard is removed from the smartcard connector, e.g. pulled out of the card slit of the smartcard connector. In particular, the card-presence circuitry 14 may provide a digital presence signal indicating presence/absence of a smartcard at the smartcard reader and particularly the smartcard connector 16. In particular, the presence signal may correspond to a logical high if a smartcard is currently present (i.e. received) at the smartcard connector and a logical low if no smartcard is currently present at the smartcard connector. The card presence circuitry 14 may for example comprise at least one of a mechanical switch, a hall-effect sensor, an NFC sensor or an optical sensor to provide a respective presence signal.

In ISO/IEC 7816-compliant smartcard readers, the card presence signal (sometimes called the card detect signal and also referred to as card presence line) may generally be an electrical signal used to inform a host system whether a smartcard is physically inserted in the smartcard connector. This signal may typically be implemented as a dedicated pin or sensor circuit that changes state when the card engages or disengages with the reader's contacts. When a smartcard is inserted, the presence signal may be driven to a logic level (e.g., high) indicating "card present". When the smartcard is removed, the line transitions to the opposite state (e.g., low), signaling "card absent". Host operating systems and middleware may rely on these transitions to trigger events such as card initialization, ATR parsing, or session termination.

The interface may generally allow communication with a host. Very generally communication may be wired or wireless. Preferably, the communication may be wired as this may advantageously provide a higher level of security and/or allow for the host supplying power to the smartcard reader. In particular, the interface may allow for communication via USB and/or UART. In other words, the smartcard reader may generally interface with a hist via USB, UART, or another suitable communication interface.

The microcontroller 12 may generally be configured to perform the following steps once a signal from the input mechanism 11 indicating a user input is received and/or registered: interrupt power to a received smartcard via the power-gating circuitry 13, manipulate the card-presence detection circuitry 14 and/or the presence signal such that the presence signal indicates absence of the smartcard, thereby simulating removal of the physically still present smartcard, manipulate the card-presence detection circuitry 14 and/or the presence signal such that the presence signal indicates presence of the smartcard, and restore power to the received smartcard via the power-gating circuitry 13, thereby simulating reinsertion of the physically still present smartcard. These steps may preferably be performed in the above sequence/order.

Very generally, the smartcard reader 1 is configured to simulate extraction and reinsertion of a smartcard upon receiving a user input via the input mechanism 11. In particular, the smartcard reader may be configured to electronically simulate the full sequence of smartcard extraction and reinsertion. This may include a controlled interruption of power supplied to the smartcard, manipulation of card-presence signal (also referred to as card-presence detection signals or card presence line), regeneration of an answer to reset (ATR) and notification to a host computer of a card removal event followed by a card insertion event.

Generally, hosts and more generally operating systems may interpret a change in the presence signal as a physical removal or reinsertion event. Therefore, manipulating (e.g. toggling) this line electronically without moving the card may advantageously allow the reader to simulate extraction and reinsertion. This may be essential for FIDO2 user-presence checks, which depend on such events to validate user interaction. The disclosed smartcard reader may manipulate the presence signal in coordination with VCC cycling and ATR regeneration to ensure the host perceives a genuine reinsertion sequence. In this regard, care may be taken to ensure correct timing and debounce characteristics as improper manipulation can cause host misinterpretation or driver errors. In some embodiments, the presence signal may be controlled directly by the microcontroller or via a redundant hardware circuit for fail-safe operation In ISO/IEC 7816 smartcard systems, the Answer to Reset (ATR) may generally be a data string transmitted by the smartcard to the host immediately after a reset sequence. The ATR may serve as the smartcard's initial handshake, conveying essential parameters such as protocol type, supported features, and timing constraints. It may enable the host to configure communication settings and establish a secure session.

The ATR may be generated whenever the smartcard undergoes a cold or warm reset, which may typically occur after insertion into a reader or after power cycling. Preferably, a smartcard may automatically generate the ATR whenever it is supplied with electrical power, provided with a clock and provided with a respective reset signal. Operating systems and middleware often interpret the presence of a new ATR as evidence of a fresh insertion event. Consequently, for user-presence verification in FIDO2 workflows, regenerating the ATR is critical to ensure the host recognizes the simulated reinsertion as authentic. The disclosed invention leverages controlled power interruption and restoration to trigger ATR regeneration without physically removing the card, maintaining compliance with ISO 7816-3 timing requirements.

Figure 2A:
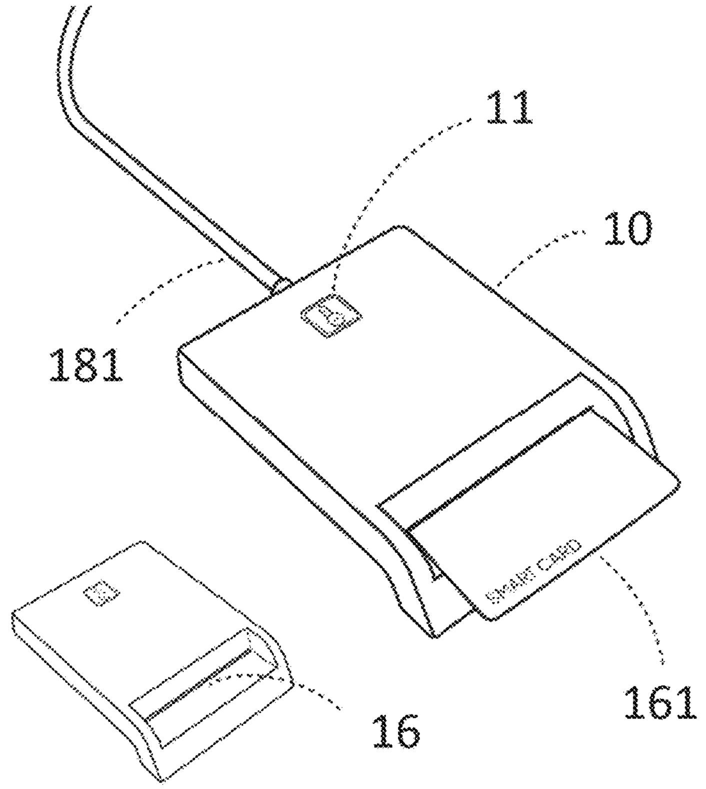
FIG. 2A illustrates a perspective view of an exemplary smartcard reader for contact-based smartcards.

FIG. 2A illustrates a smartcard reader 1 according to the present invention. The smartcard reader comprises a housing 10 and an input mechanism 11, e.g. a button or touch sensitive sensor. The input mechanism is located in and fastened to the housing 10 in such a way that it can easily be actuated by a user, e.g. without having to lift the smartcard reader. The smartcard reader comprises a smartcard connector 16 configured to receive a smartcard 161. In the depicted exemplary embodiment, the smartcard reader and particularly the smartcard connector 16 is configured for receiving a contact-based smartcard 161. That is, a smartcard to which a connection is established through physical contact, e.g. by means of electrical contact pins. For communicating with a host system, the smartcard reader generally comprises an interface 18, which may for example e configured for a wired connection through a cable 181, e.g. a USB cable. A wired connection may advantageously allow for the host system to supply electrical power to the smartcard reader. This way, the smartcard reader itself may not require a source of electrical power or a designated power supply.

Figure 2B:
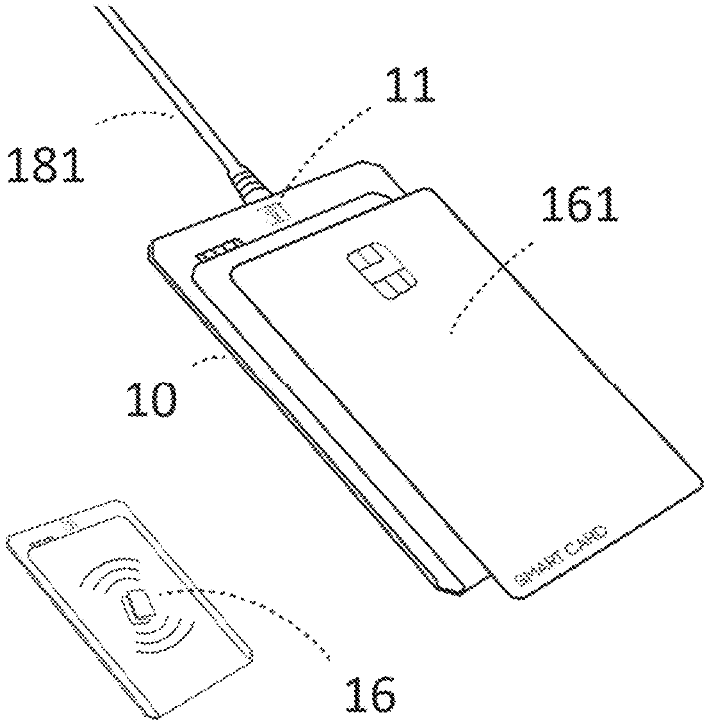
FIG. 2B illustrates a perspective view of an exemplary smartcard reader for contactless smartcards.

FIG. 2B depicts another exemplary embodiment of a smartcard reader, similar to the one depicted in FIG. 2A. However, this time the smartcard connector 16 is configured for receiving a contactless smartcard 161. In particular, the smartcard connector 16 may comprise an NFC interface.

Figure 3:
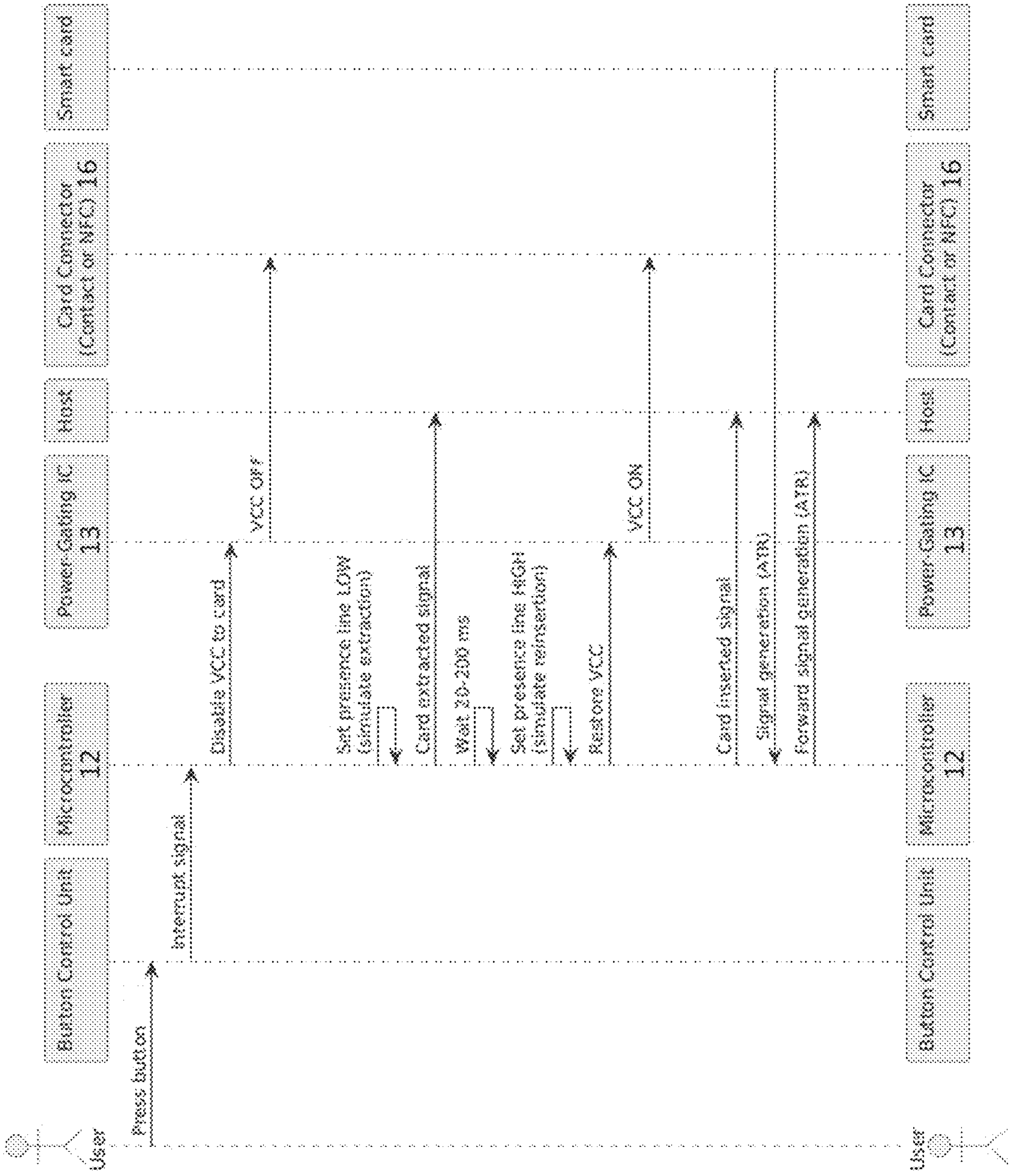
FIG. 3 illustrates an exemplary sequence diagram of a card extraction and reinsertion simulation.

FIG. 3 depicts an exemplary sequence diagram of a smartcard extraction and reinsertion simulation with a smartcard reader 1 according to the present invention when connected to a respective host. To simulate extraction and reinsertion of a smartcard received by the smartcard reader 1 and particularly the smartcard connector 16, a user may initially actuate the input mechanism 11, e.g. a button 11. In other words, the user may for example press a button 11 of the smartcard reader. The user pressing the button 11 may be indicated to the microcontroller 12. For example, a button control unit may transmit a respective interrupt signal to the microcontroller 12. More generally, the user actuating the input mechanism 11 may generally be indicated, e.g. signaled, to the microcontroller, for example by providing a respective signal to the microcontroller 12. The microcontroller 12 may control the power-gating circuitry 13, e.g. a power-gating integrated circuit, to disable electrical power to the received smartcard. In particular, the microcontroller 12 may control the power-gating circuitry 13 to disable electrical power supplied to the received smartcard via the card connector 16. Preferably, the power-gating circuitry 13 may disable VCC.

Subsequently, the microcontroller 12 may set the presence line (i.e. the card presence signal) low to simulate an extraction of the smartcard. That is, the card-presence detection circuitry 14 may generally provide a presence signal indicating presence and/or absence of a smartcard at the smartcard reader and particularly the smartcard connector 16. That is, the presence signal may indicate whether a smartcard is received by the smartcard connector 16 or not. The presence signal may also be referred to as presence line. Thus, the microcontroller 12 may manipulate (e.g., toggle) the presence signal (i.e., the presence line) and provide either the manipulated presence signal or a corresponding card extraction signal to the host. Subsequently, the microcontroller 12 may wait for a predefined delay, preferably in the range of 20 ms to 200 ms. Then the microcontroller 12 may manipulate the presence signal (i.e., the presence line)

to high, i.e. to a state indicating presence of the smartcard. Again, the manipulated/restored presence signal and/or a respective card inserted signal may be provided to the host.

Furthermore, the microcontroller 12 may control the power-gating circuitry 13 to restore electrical power to the smart card via the card connector 16. That is, VCC may be restored. This may take place before, after or parallel to transmitting the card inserted signal/manipulated presence signal to the host.

Once power to the smartcard is restored the smartcard may generate an ATR which may be transmitted to the microcontroller 12, which in turn may forward the ATR to the host.

By manipulating the presence signal and the power to the smartcard, the host is provided with the signals expected during a card extraction and reinsertion and thus a user-presence check through card extraction and reinsertion may successfully be performed by the user actuating the input mechanism 11 instead of physically removing and reinserting the smartcard to the smartcard reader.

Figure 4:
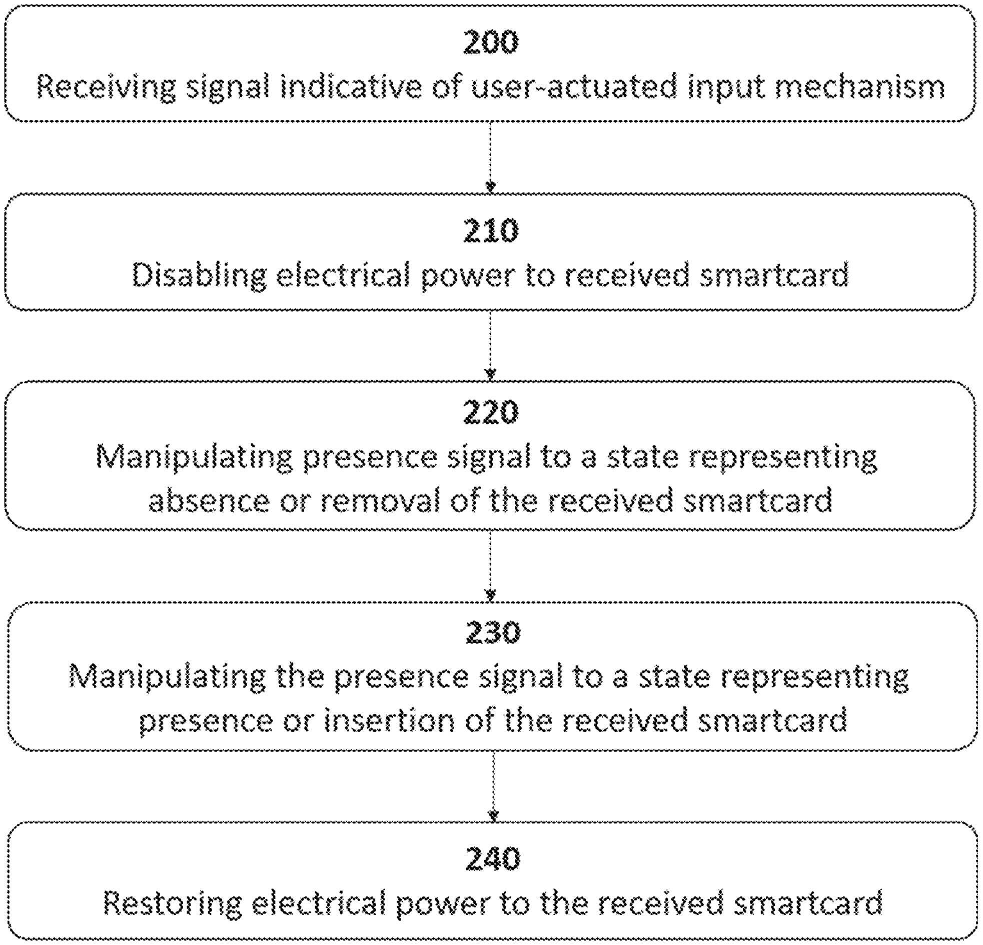
FIG. 4 illustrates an exemplary embodiment of a method according to the present invention.

With respect to FIG. 4, the present invention also relates to a respective method for simulating physical extraction and reinsertion of a smartcard physically received by a smartcard reader. One the smartcard is physically received by the smartcard reader, a card extraction and reinsertion may be required, e.g. as a user-presence check. Instead of physically removing and reinserting the smartcard, the method according to the present invention may be applied to simulate said extraction and reinsertion.

In particular, a signal indicative of actuation of a user-actuated input mechanism may be received (step 200). That is, a respective input mechanism may be actuated by a user to trigger a desired simulation of extraction and reinsertion of the smartcard. Subsequently, the electrical power to the smartcard may be disabled (step 210) and the presence signal indicating the smartcard being received by the smartcard reader and particularly the smartcard connector (i.e. the presence of the smartcard at the smartcard reader) may be manipulated to a state representing absence or removal of the smartcard (step 220).

Subsequently, the presence signal may be manipulated to a state representing presence or insertion of the smartcard (step 230) and electrical power to the smartcard may be restored (step 240).

The smartcard may remain untouched during the method of simulating extraction and reinsertion. That is, the smartcard may not physically be moved during this method.

Furthermore, the smartcard may be caused to generate an Answer to Reset (ATR), particularly through disabling and restoring of electrical power to the smartcard. Generally, the smartcard reader may be a smartcard reader according to the present invention, e.g. as described above with respect to FIGS. 1, 2A and 2B.

Through the manipulation of physical signals (VCC and presence signal/presence line), the present invention advantageously allows to improve the reliability of a host system interpreting the event as genuine reinsertion, particularly compared to software-only approaches. The reliability may also be enhanced through elimination of mechanical wear and contact degradation caused by repeated physical removal and reinsertion of the smartcard, which improves longevity of the smartcard reader and the smartcard. Furthermore, controlled timing of disabling and restoring electrical power to the received smartcard may advantageously maintain compatibility with ISO 7816-3 reset requirements, thereby reducing a risk of communication errors. Through provision of a simple, user-actuated input mechanism (e.g. a button) for confirming presence of a user without physically handling the smartcard, the overall user experience is advantageously improved. In particular, the user does not have to fiddle with the smartcard and the card reader to extract and reinsert the smartcard, but merely has to actuate a simple input mechanism designated for being easily and conveniently actuated through the user.

In other words, the present invention may relate to a smartcard reader with a user-actuated input mechanism, e.g. button. Upon actuation, a timed sequence that interrupts and then restores power to the smartcard and manipulates card-presence detection may be executed, e.g. by firmware running on a microcontroller. This may also cause regeneration of the ATR (Answer to Reset), particularly if a respective reset signal and a clock are additionally provided to the smartcard. The host may interpret these signals as genuine removal and reinsertion of the smartcard, while the smartcard remains physically stationary within the smartcard connector. Advantages include reduced mechanical wear, improved reliability, and streamlined user-presence confirmation for FIDO2 smartcards.

Furthermore, the present invention may relate to a method for simulating card extraction and reinsertion by coordinated control of power-gating hardware and presence-detection circuitry according to timing parameters compatible with ISO 7816-3 and typical host operating systems.

Yet further, the present invention may relate to a non-transitory computer-readable medium which may store instructions that, when executed by one or more processors (e.g. a microcontroller) of a smartcard reader, cause the processors to carry out a simulation sequence and communicate removal and insertion events to the host.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, embodiments have been described with reference to the accompanying drawings, the skilled person will understand that these embodiments are provided for illustrative purpose only and should by no means be construed to limit the scope of the present invention, which is defined by the claims.

What is claimed is:

1. A smartcard reader comprising:

a housing;

an input mechanism configured to be actuated by a user;

a smartcard connector configured to receive a smartcard;

a microcontroller;

a power-gating circuitry configured to interrupt and restore electrical power to a smartcard received by the smartcard connector; and a card-presence detection circuitry configured to provide a presence signal indicating presence and/or absence of a smartcard at the smartcard connector;

wherein the smartcard reader is configured to electronically simulate extraction and reinsertion of a smartcard received by the smartcard connector without physically removing said smartcard from the smartcard connector; and wherein the smartcard reader is configured to simulate extraction and reinsertion conditional on receiving a user input via the input mechanism.

2. The smartcard reader according to claim 1, wherein the smartcard reader is configured to perform a controlled interruption of power to a received smartcard via the power-gating circuitry, and a controlled restoration of power to a received smartcard via the power-gating circuitry.

3. The smartcard reader according to claim 1, wherein the smartcard reader is configured to manipulate the presence signal to simulate removal of a received smartcard, and to manipulate the presence signal to simulate reinsertion of a received smartcard.

4. The smartcard reader according to claim 1, wherein the microcontroller is configured to perform the following steps conditional on receiving a signal from the input mechanism indicating a user input:

interrupt power to a received smartcard via the power-gating circuitry;

manipulate the card-presence detection circuitry and/or the presence signal such that the presence signal indicates absence of the smartcard, thereby simulating removal of the physically still present smartcard;

manipulate the card-presence detection circuitry and/or the presence signal such that the presence signal indicates presence of the smartcard; and restore power to the received smartcard via the power-gating circuitry; thereby simulating reinsertion of the physically still present smartcard.

5. The smartcard reader according to claim 4, wherein the microcontroller is configured to restore power after a predefined delay, wherein the delay is in the range of 10 ms to 500 ms.

6. The smartcard reader according to claim 5, wherein the predefined delay is programmable.

7. The smartcard reader according to claim 1, wherein the smartcard reader is configured such that electronically simulating extraction and reinsertion of the smartcard received in the smartcard connector triggers generation of an Answer to Rest (ATR) by the smartcard.

8. The smartcard reader according to claim 1, wherein the input mechanism comprises at least one of a button, a touch sensor, a proximity sensor, a biometric sensor, a microphone-based trigger, or a gesture recognition.

9. The smartcard reader according to claim 1, wherein the smartcard connector is configured to receive a contact-based smartcard.

10. The smartcard reader according to claim 1, wherein the microcontroller is configured to manipulate the presence signal provided by card-presence detection circuitry.

11. The smartcard reader according to claim 1, wherein the smartcard reader further comprises an interface configured to enable communication with an external host.

12. The smartcard reader according to claim 1, wherein the smartcard reader comprises a redundant fallback circuit configured to ensure manipulation of the presence signal independent of the microcontroller.

13. A method for simulating physical extraction and reinsertion of a smartcard physically received by a smartcard reader, the method comprising:

receiving a signal indicative of actuation of a user-actuated input mechanism;

disabling electrical power to the smartcard;

manipulating a presence signal to a state representing absence or removal of the smartcard;

manipulating the presence signal to a state representing presence or insertion of the smartcard;

restoring electrical power to the smartcard; and causing the smartcard to generate an Answer to Reset (ATR);

while the smartcard remains physically received by the smartcard reader.

14. The method according to claim 13, wherein the smartcard reader is a smartcard reader comprising:

a housing;

an input mechanism configured to be actuated by a user;

a smartcard connector configured to receive a smartcard;

a microcontroller;

a power-gating circuitry configured to interrupt and restore electrical power to a smartcard received by the smartcard connector; and a card-presence detection circuitry configured to provide a presence signal indicating presence and/or absence of a smartcard at the smartcard connector;

wherein the smartcard reader is configured to electronically simulate extraction and reinsertion of a smartcard received by the smartcard connector without physically removing said smartcard from the smartcard connector; and wherein the smartcard reader is configured to simulate extraction and reinsertion conditional on receiving a user input via the input mechanism.

15. The method according to claim 13, wherein the step of manipulating the presence signal to a state representing absence or removal of the smartcard comprises driving a presence signal low during simulated removal, and wherein the step of manipulating the presence signal to a state representing presence or insertion of the smartcard comprises driving a presence signal high during simulated reinsertion.

16. The method according to claim 13, wherein the step of restoring electrical power to the smartcard is delayed with respect to the step of disabling electrical power to the smartcard by a predefined delay, wherein the predefined delay is in the range of 10 ms to 500 ms.

17. The method according to claim 16, wherein the predefined delay is programmable.

18. The method according to claim 13, wherein the method further comprises detecting a failure condition and activating a redundant hardware fallback circuit for manipulating the presence signal.

19. The method according to claim 13, wherein the method further comprises communicating with a host device.

20. A non-transitory computer-readable medium storing instructions that, when executed by a microprocessor of a smartcard reader, cause the microprocessor to perform the following steps:

receiving a signal indicative of actuation of a user-actuated input mechanism;

disabling electrical power to the smartcard;

manipulating a presence signal to a state representing absence or removal of the smartcard;

manipulating the presence signal to a state representing presence or insertion of the smartcard;

restoring electrical power to the smartcard; and causing the smartcard to generate an Answer to Reset (ATR);

while the smartcard remains physically received by the smartcard reader.

* * * * *